United States Patent
Muller

(10) Patent No.: US 9,403,139 B2
(45) Date of Patent: Aug. 2, 2016

(54) MIXING DEVICE WITH TANGENTIAL INLETS FOR TWO-PHASE CONCURRENT VESSELS

(71) Applicant: MORTEN MULLER LTD. APS, Fredensborg (DK)

(72) Inventor: Morten Muller, Fredensborg (DK)

(73) Assignee: MORTEN MULLER LTD. APS, Fredensborg (DK)

(*) Notice: Subject to any disclaimer, the term of this patent is extended or adjusted under 35 U.S.C. 154(b) by 226 days.

(21) Appl. No.: 14/183,794

(22) Filed: Feb. 19, 2014

(65) Prior Publication Data

US 2014/0231308 A1    Aug. 21, 2014

Related U.S. Application Data

(60) Provisional application No. 61/766,427, filed on Feb. 19, 2013.

(30) Foreign Application Priority Data

Feb. 19, 2013    (EP) .................................... 13155723

(51) Int. Cl.
*B01J 8/00* (2006.01)
*B01J 8/04* (2006.01)
(Continued)

(52) U.S. Cl.
CPC ............... *B01J 8/008* (2013.01); *B01F 5/0057* (2013.01); *B01F 5/0451* (2013.01); *B01F 5/0463* (2013.01); *B01J 8/0278* (2013.01); *B01J 8/0453* (2013.01); *B01J 8/0492* (2013.01); *B01J 10/00* (2013.01); *C10G 45/04* (2013.01); *C10G 47/02* (2013.01); *C10G 49/002* (2013.01); *C10G 65/02* (2013.01); *B01F 2005/0017* (2013.01); *B01J 2208/00849* (2013.01);
(Continued)

(58) Field of Classification Search
CPC ............. B01J 2208/00849; B01J 2208/00336; B01J 2208/00371
See application file for complete search history.

(56) References Cited

U.S. PATENT DOCUMENTS 5,690,896 A   11/1997   Stangeland et al.
5,756,055 A   5/1998    Kelly et al.
(Continued)

OTHER PUBLICATIONS

Search Report from Eurasian Patent Office on co-pending Eurasian application (EA 201490298) dated Jun. 30, 2014.
(Continued)

*Primary Examiner* — Lessanework Seifu
(74) *Attorney, Agent, or Firm* — Klein, O'Neill & Singh, LLP

(57) ABSTRACT

A mixing device for mixing concurrently-flowing streams of vapor and liquid in a vessel contains flow baffles forming a tangential inlet orifice through which the liquid and vapor streams flow at high flow velocity and in a tangential direction into a swirl box. The high momentum of the streams in the inlet orifice, the tangential direction of the streams, and the large distance between the inlet orifice and the vessel centerline, result in a violent swirling flow and a large number of fluid rotations in the swirl box, thereby thoroughly mixing the streams entering through the inlet orifice. A mixed stream of vapor and liquid exits the mixing device through an outlet opening in the bottom of the mixing device. An impingement plate located below the outlet opening spreads the liquid and decreases the velocity of the mixed stream. The temperature and chemical composition of the mixed stream are equilibrated.

25 Claims, 7 Drawing Sheets

(51) Int. Cl.
*B01J 8/02* (2006.01)
*C10G 49/00* (2006.01)
*C10G 65/02* (2006.01)
*B01J 10/00* (2006.01)
*C10G 45/04* (2006.01)
*C10G 47/02* (2006.01)
*B01F 5/00* (2006.01)
*B01F 5/04* (2006.01)

(52) U.S. Cl.
CPC .............. *B01J 2208/00929* (2013.01); *B01J 2208/00938* (2013.01); *B01J 2219/0286* (2013.01)

(56) References Cited

U.S. PATENT DOCUMENTS

| 5,989,502 | A | * | 11/1999 | Nelson | ............... B01D 3/20 261/108 |
| 2002/0039547 | A1 | | 4/2002 | Nelson et al. | |
| 2006/0257300 | A1 | | 11/2006 | Breivik et al. | |
| 2010/0276821 | A1 | | 11/2010 | Lee et al. | |
| 2010/0303685 | A1 | | 12/2010 | Kemoun et al. | |
| 2012/0241006 | A1 | | 9/2012 | Chen et al. | |

OTHER PUBLICATIONS

Search Report from European Patent Office on co-pending EP application (13155723.3) dated Aug. 14, 2013.

* cited by examiner

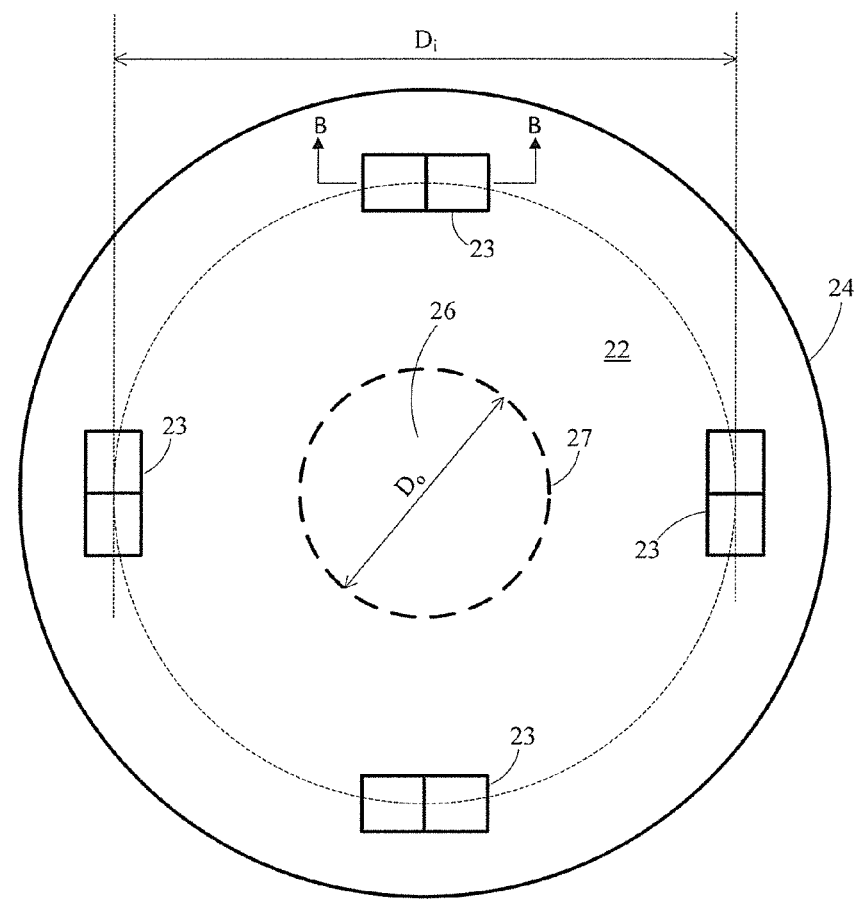
FIG. 2B (PRIOR ART, VIEW A-A)
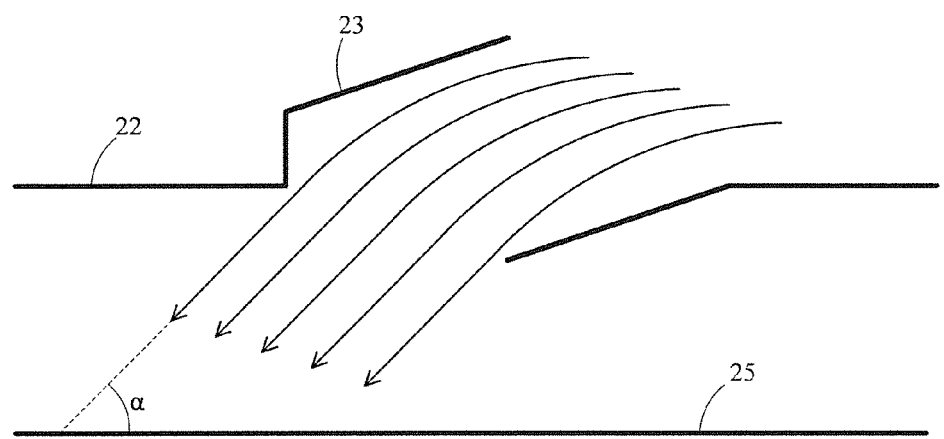
FIG. 2C (PRIOR ART, SECTION B-B)

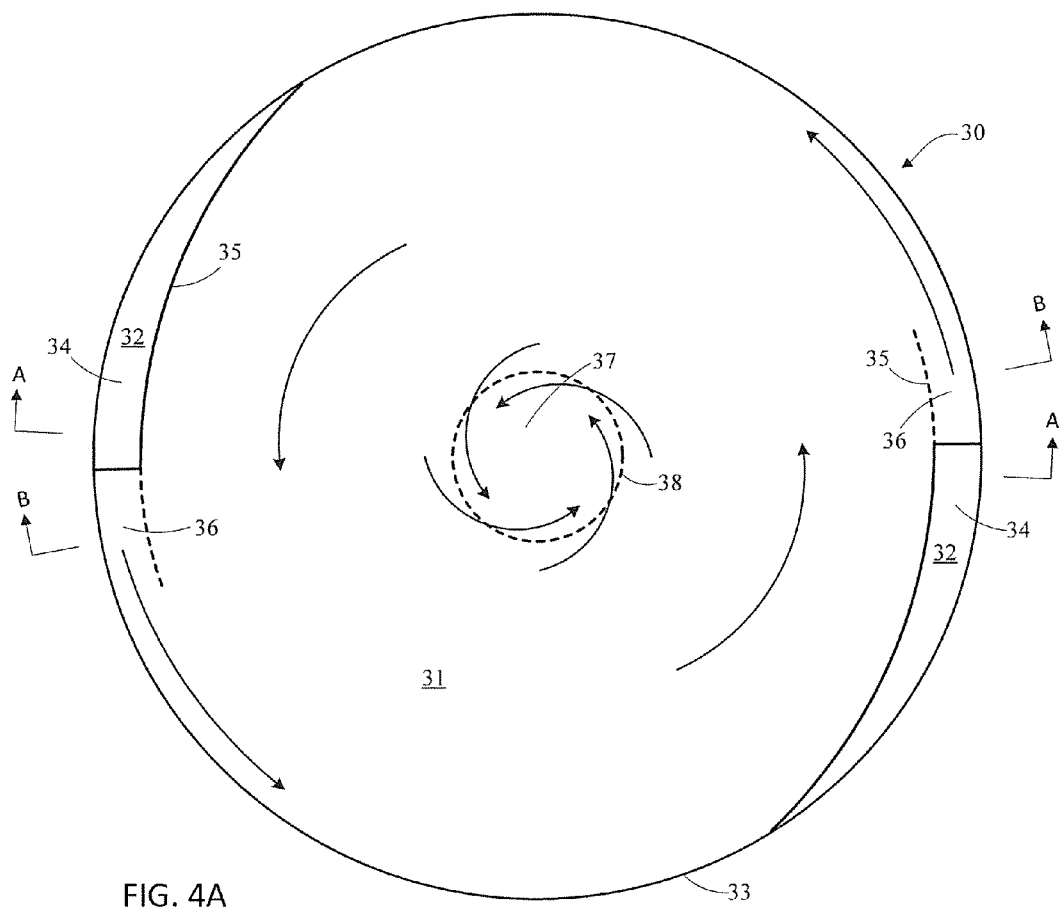
FIG. 4A
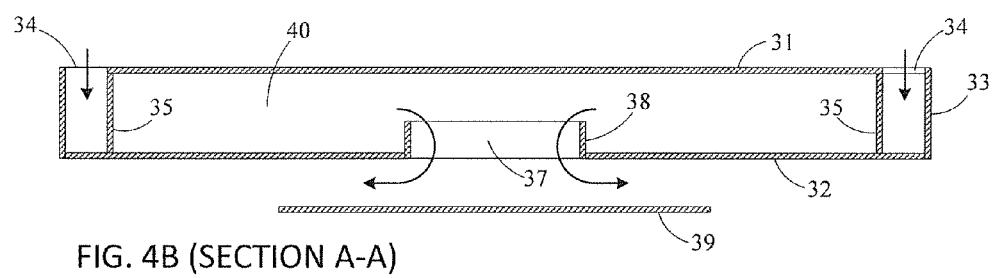
FIG. 4B (SECTION A-A)
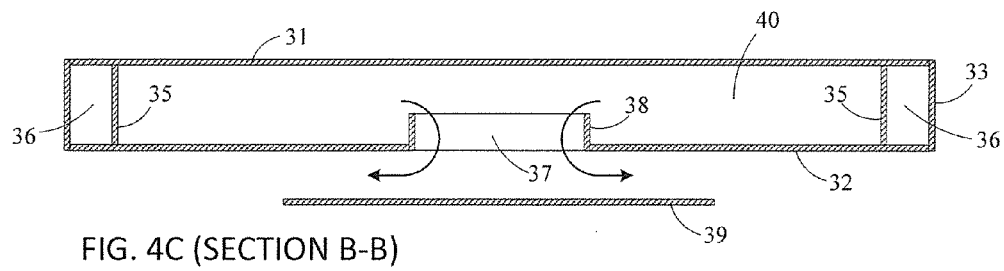
FIG. 4C (SECTION B-B)

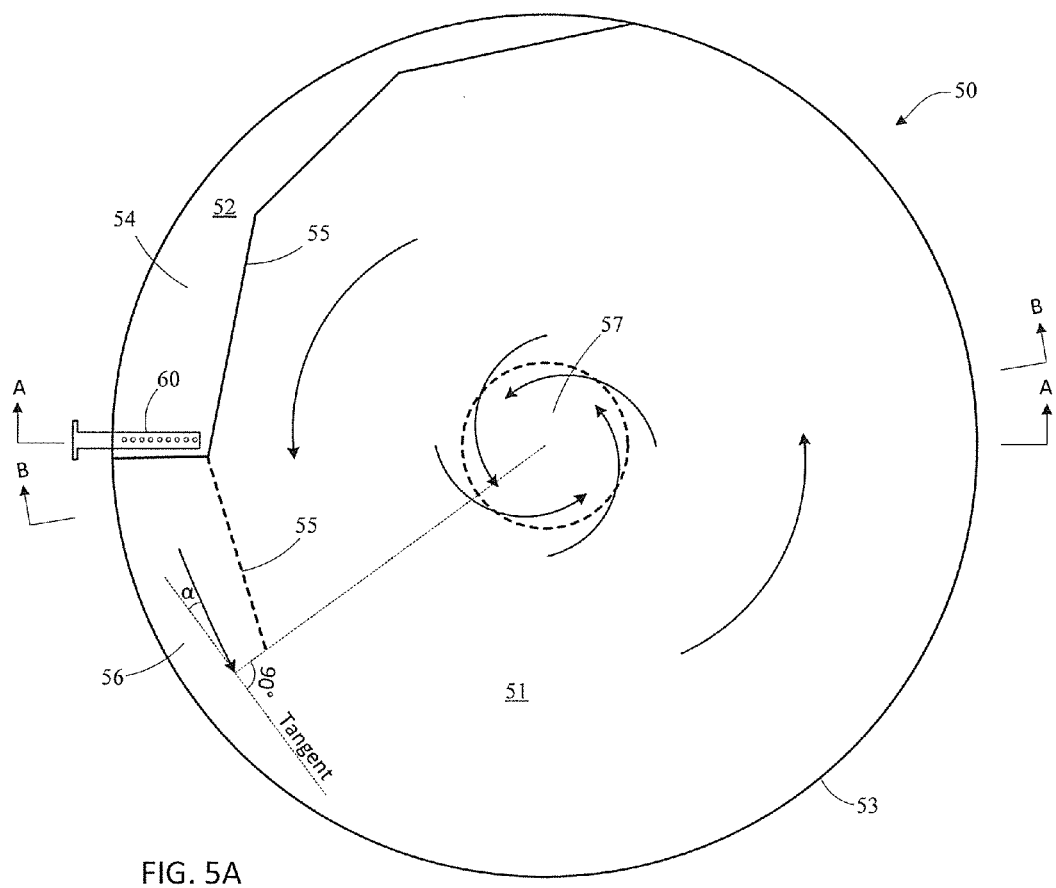
FIG. 5A
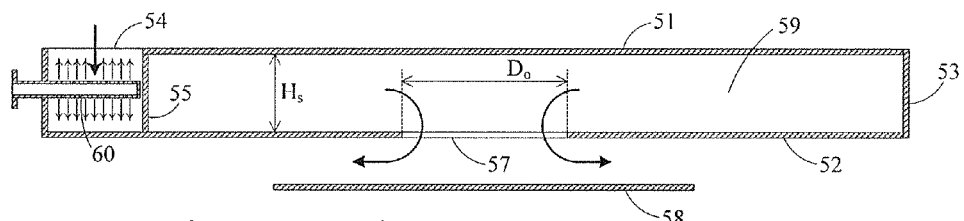
FIG. 5B (SECTION A-A)
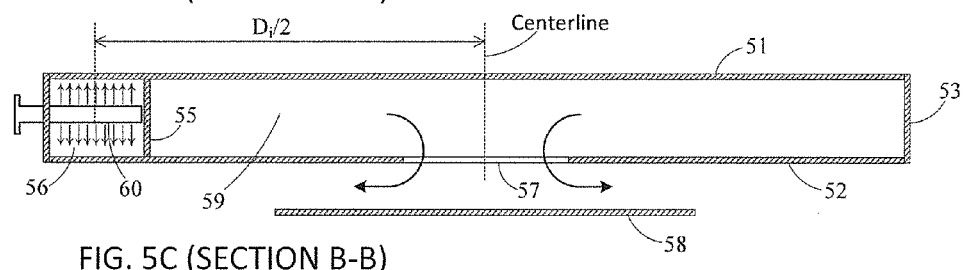
FIG. 5C (SECTION B-B)

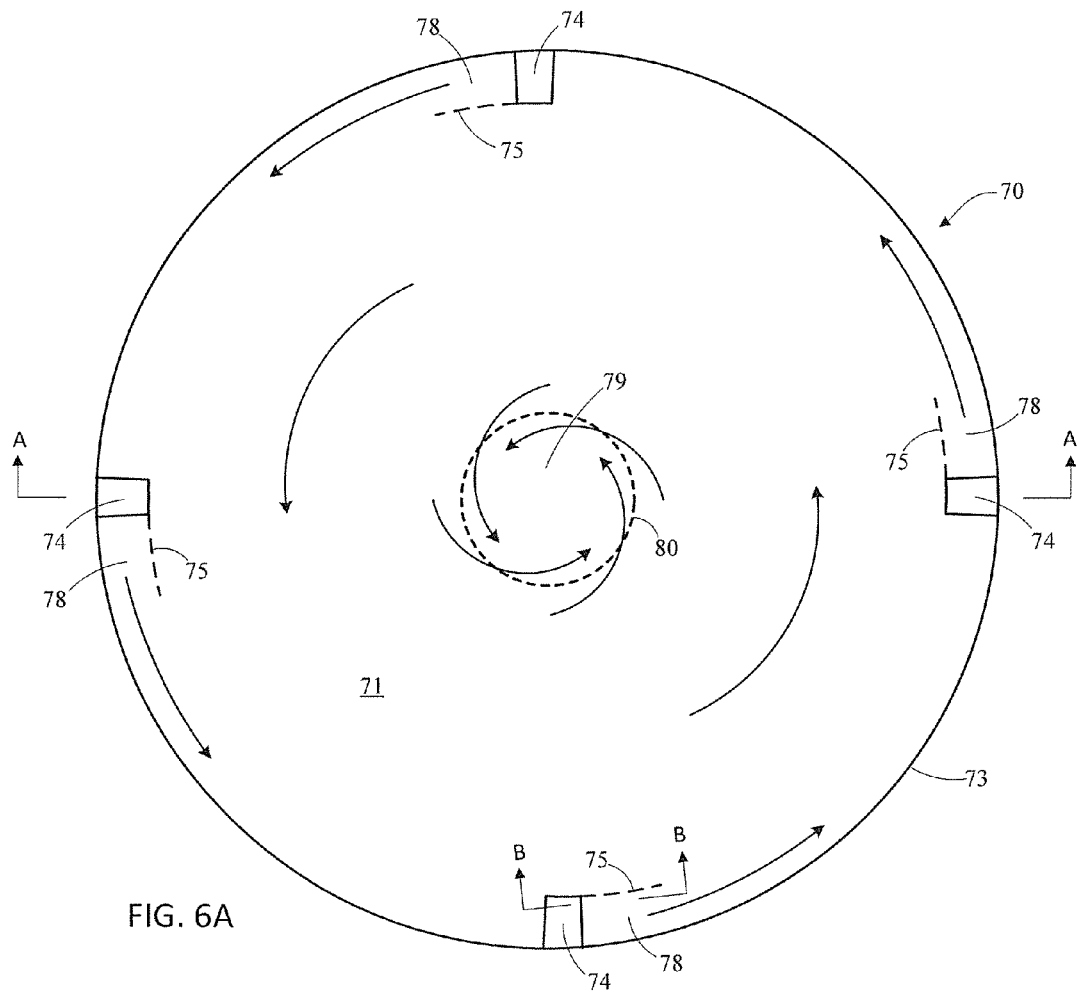
FIG. 6A
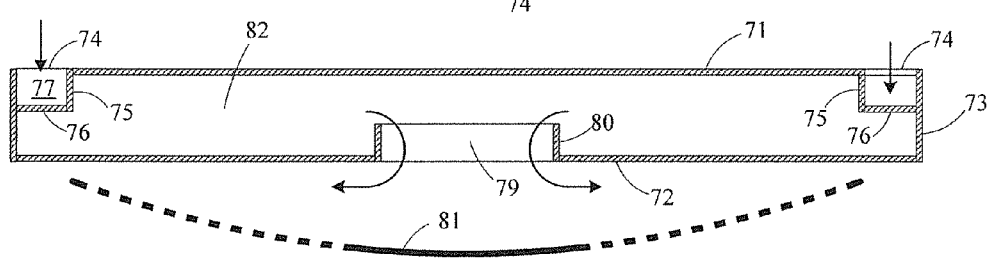
FIG. 6B (SECTION A-A)
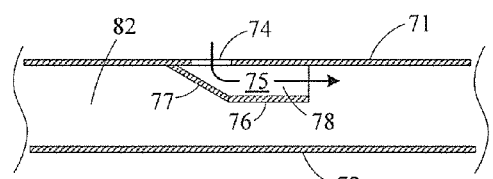
FIG. 6C (SECTION B-B)

MIXING DEVICE WITH TANGENTIAL INLETS FOR TWO-PHASE CONCURRENT VESSELS

CROSS-REFERENCE TO RELATED APPLICATION

This application claims the benefit, under 35 U.S.C. §119 (e), of U.S. Provisional Application No. 61/766,427, filed Feb. 19, 2013, the disclosure of which is incorporated herein by reference in its entirety. This application claims priority from European Application No. EP 13155723.3, filed Feb. 19, 2013, the disclosure of which is incorporated herein by reference in its entirety.

BACKGROUND

The present disclosure relates to a mixing device for admixing gas or vapor, and liquid in a vessel where a vapor phase and a liquid phase are flowing concurrently. The purpose of the device is to equilibrate the temperature and chemical composition of the outlet mixture exiting the device. The disclosure is suited for, but not limited to, the application of admixing hot hydrogen-rich treatgas and hot hydrocarbon liquid with a cold quench stream between two adjacent beds of catalyst in a hydroprocessing reactor, such as a hydrotreating or hydrocracking reactor.

A large number of mixing devices for two-phase concurrent vessels have been described in literature and patents. The majority of these devices belong to one of the six types given below:

Type 1: Vortex Mixers with Inlet Chutes or Channels Provided in a Collection Tray An example of such a design is given in U.S. Pat. No. 3,541,000. The mixer comprises a horizontal collection tray plate 6. The collection tray plate is provided with a plurality of sloped chutes 32/34. The entire process stream of vapor and liquid from the catalyst bed above passes through these inlet chutes at high velocity. Below the collection tray is a swirl box 8. The exit jets from the chutes have tangential components and result in a swirling fluid motion inside the swirl box. The fluids then pass over an internal weir 12 and downward through a center opening 10. At the outlet of the opening 10, the cold quench fluid is added through perforated distributor pipes in a spider arrangement 30. A distribution tray 14 is located below the mixer for rough distribution of the liquid. The tray 14 also serves as an impingement plate for the high velocity fluids exiting the opening 10. A distribution tray 4 is located below the rough distribution tray for final distribution of the liquid.

U.S. Pat. No. 4,836,989 describes a mixer similar to the mixer in U.S. Pat. No. 3,541,000. However, for improved mixing of the quench fluid with vapor and liquid from the catalyst bed above, the quench fluid is added through perforated pipe distributors 13 upstream the collection tray 12 instead of downstream.

Examples of patents that relate to vortex types of mixers are: U.S. Pat. Nos. 5,837,208; 5,989,502; 7,045,103; 7,112, 312; and U.S. Patent Application Publication 2012/0241006.

Type 2: Swirl Box Mixers with Radial Inlet Flow

An example of such a design is given in U.S. Pat. No. 3,353,924. The mixer comprises a collection plate 6. The cold quench medium is added through a perforated pipe ring 11 above the collection plate. The vapor and liquid from the catalyst bed 3 above the mixer and the quench fluid enter the swirl box 7 through a plurality of inlet ports 8. Unlike the vortex mixer designs mentioned above, the flow through the inlet ports to the swirl box in this type of mixer is mainly in the horizontal/radial direction. The inlet ports are provided with vanes 9 which introduce a swirling motion to the fluids inside the swirl box 7. The fluid exits the swirl box through a center opening 13a. A perforated impingement plate 14 with vertical baffles 16 is provided below the center opening.

Other examples of swirl box mixers with radial inlet flow are given here:

U.S. Pat. No. 3,787,189 describes a swirl box mixer similar to the mixer in U.S. Pat. No. 3,353,924. However, the inlet openings and vanes to the swirl box have a different design, and the impingement plate 23 below the center opening 20 is not perforated. Vanes 22 introducing a swirling motion to the fluids exiting the mixer below the collection plate 18 replace the radial arranged vertical baffles at the mixer outlet.

U.S. Pat. No. 5,462,719 describes a swirl box mixer similar to the mixer in U.S. Pat. No. 3,353,924. The vapor and liquid are first passed through radial perforations in cylindrical baffle 24, then through vanes 22, which results in swirling fluid motions inside the swirl box. The fluids exit the swirl box through the central opening 21 and enter a second mixing box located below the collection plate 20. In the second mixing box, the fluids flow radially outwards and exit the mixer through the radial perforations in cylindrical wall 26.

U.S. Pat. No. 5,534,233 describes another swirl box mixer. Liquid is collected on tray 101, and the vapor and liquid enter the swirl box in a radial direction. Vertical guide plates 105 are used to create a swirling flow before the fluids exit the mixer through the center opening 7. An impingement plate 13 below the center opening, breaks down the high velocity of the stream.

Type 3: Bubble Cap Like Mixers

A bubble cap mixer design is disclosed in U.S. Pat. No. 5,152,967. The mixer comprises a collection plate 16 and a cap 18, 19 overlaying a downcomer 17. The cap and downcomer define the first mixing swirl chamber. The sidewalls of the cap 19 are provided with angled openings. The angled openings cause the vapor and liquid entering the first swirl chamber, to move in a swirling motion. The fluids first flow upward, over the upper edge of downcomer 17, and then downward through the downcomer and a central opening in the plate 16. The mixer is also provided with a second swirl chamber located below the first swirl chamber with inward radial flow.

Other examples of bubble cap like mixers are given here:

U.S. Pat. No. 6,183,702 describes another bubble cap like mixer. The mixer consists of a collection plate 1125, which holds a certain liquid level. The collection plate is provided with vertical baffles 1130, which promote a swirling motion of the liquid on the plate 1125. The swirling motion is further intensified by quench fluid jets exiting from pipes 1140. On the collection tray, a bubble cap like mixer, comprising a slotted cylindrical cap 1150 overlaying a cylindrical downcomer 1165, is mounted over a central opening in plate 1125. The annular space between the cap and the downcomer is provided with semi spiral shaped baffles 1155. The vapor enters the annular space through the slots in the cylindrical wall of cap 1150. The vapor "lifts" the liquid up into the annular space and the vapor and liquid flow upwards through the annular space. Baffles 1155 cause a swirling motion in the annular space. The vapor and liquid flow down through the downcomer and through the opening in the collection plate 1125.

U.S. Pat. No. 8,017,095 describes another bubble cap like mixing device. The mixing device consists of a large bubble cap 85, similar to the bubble cap used in U.S. Pat. No. 6,183, 702, located on an annular collection tray 30. Upstream, the bubble cap 85 is a swirl chamber consisting of side walls 42 and 48, inlets 50 and 55, top wall of inlets 46 and 47 and top wall 49.

U.S. Pat. Nos. 3,824,080 and 5,403,560 provide other examples of bubble cap like mixers.

Type 4: Mixers with Separate Mixing of Vapor and Liquid

U.S. Pat. No. 5,635,145 discloses a mixer with separate mixing of vapor and liquid. The mixer comprises a collection plate 6 with a center opening. Above the center opening, a vapor swirl box 8 for mixing the vapors is located. The vapor swirl box is provided with apertures 14. The collection plate is provided with other openings with guiding channels 7 to direct the liquid towards the centerline of the reactor. A pre-distribution tray/impingement plate 15 is located below the mixer.

During normal operation, the collection plate 6 holds a certain liquid level and the vapor enters the vapor swirl box 8 and exits through the center opening. The liquid bypasses the swirl box through the parallel liquid channels 7.

U.S. Pat. No. 5,772,970 is another example of a mixing device with separate mixing of vapor and liquid. The mixer consists of collection tray 12 provided with a cylindrical swirl baffle 13, a center opening 14, and vapor chimneys 17. A cylindrical weir 15 is provided at the rim of outlet opening 14. During operation, liquid will collect on the collection tray 12 and the liquid level will build up to at least the height of weir 15. A swirling motion between the swirl baffle 13 and the weir 15 is caused by the tangential liquid inlets 13a and 13b. The liquid overflows the weir 15 and exits through center opening 14. The vapor largely bypasses the liquid through vapor chimneys 17. Part of the vapor may flow through center opening 14 together with the overflowing liquid.

U.S. Pat. Nos. 5,935,413, 7,052,654 and 7,078,002 describe other examples of mixers with separate mixing of vapor and liquid.

Type 5: Baffled Box Mixers with Vertical Flow

U.S. Pat. No. 4,233,269 describes such a design. The mixer consists of an inlet feed duct 12, where the vapor and liquid enter the mixer. From the inlet feed duct, the fluids are passed through two circular mixing orifices formed by doughnut plates 32 and 36 and through one annular flow restriction formed by the disc 34.

Type 6: Baffled Box Mixers with Horizontal Flow

U.S. Pat. No. 7,276,215 describes a baffled box mixer with horizontal flow. The mixer comprises a collection tray 13, a bottom plate 14 with a center opening 25, two-phase inlets 16, and vertical flow baffles 18, 19, and 20, forming a series of contractions and expansions, or a series of mixing orifices. The entire process stream is forced to flow through each mixing orifice at high velocity. A dispersed two-phase flow regime is achieved in each mixing orifice in order to maximize the interphase area between the vapor and the liquid, and thus maximize the heat and mass transfer between the phases. Downstream from each mixing orifice, the expansion results in turbulence and additional residence time. The mixer has a symmetric fluid approach to the outlet opening 25 for improved spread of the liquid to the distribution tray 11, located below the mixer.

U.S. Pat. No. 5,690,896 describes a second example of this type of mixer. The mixer is built as an integral part of the catalyst support system. The mixer collects vapor and liquid in the annular collecting trough 24. Quench fluid is added to the annular collection trough through quench pipes 22 and 23. The vapor and liquid flow through the annular collection trough to the mixing box 30, located between the support beams 14 and 15. The entire process stream enters the mixing box at the inlet 36. The mixing box comprises a single flow channel with 360° turn in the flow direction. After the 360° turn in the mixing box the fluid exits through the center opening 37.

U.S. Patent Application Publication US 2011/0123410 describes a third example of this type of mixer. The mixer comprises collection tray 5 with inlet opening 6, an annular mixing channel 9, and a perforated predistribution tray 11 with a chimney 13. The vapor and liquid pass through inlet opening 6 and annular mixing channel 9, and exit to the perforated pre-distribution tray 11.

U.S. Pat. No. 3,705,016 describes a fourth example. This mixer consists of a screen 11/12 located on a collection and catalyst support plate 8. The screen is covered by inert support material 7. Quench fluid is injected in the catalyst bed above the plate 8. The screen 11/12 allows the vapor and liquid to pass through, while retaining the inert material. After passing through the screen, the vapor and liquid flow vertically through the center opening in collection plate 8. A horizontal mixing box, consisting of a horizontal bottom plate 16 and vertical baffles 20, 21, 22, and 23, is located below the collection plate. The fluids exiting the center opening are first divided into two horizontal streams. Then each of the two streams is again divided into two streams, resulting in a total of four streams. At the mixer exit, two of these four streams are recombined and sent to one side of the reactor cross section, while the remaining two streams are recombined and sent to the other side of the reactor cross section. Finally, the vapor and liquid are distributed through a perforated tray 25.

A last example of a baffled box mixer with horizontal flow is described in U.S. Pat. No. 3,977,834. This patent describes a mixer consisting of a plurality of parallel mixing boxes 13. Each of the mixing boxes is located between a pair of catalyst support beams 7. Quench fluid is added through pipes 11 between the beams upstream from the mixing boxes.

Pressure drop is typically the driving force for mixing in conventional mixer designs. However, in hydrotreating and hydrocracking process units, increased pressure drop in the mixer results in significant additional costs. Examples of this are the increased initial cost of the recycle gas compressor, and increased operating cost in terms of additional shaft power required for the recycle gas compressor. For two-phase mixing, the following general criteria for achieving good mixing and an equilibrated outlet mixture for a given pressure drop have been established:

The mixer needs to have flow restrictions or mixing orifices with high flow velocity and dispersion of the liquid into droplets in order to provide a large interphase area for heat and mass transfer between the phases and to generate turbulence.

The entire process stream needs to be brought together/contacted. It is insufficient to have parallel paths through the mixer, since the parallel streams are not contacted, and an equilibrated temperature and composition of the parallel streams can therefore not be achieved.

The mixer needs areas with lower flow velocity downstream from the mixing orifices to create turbulent flow conditions in the transition from high flow velocity to lower flow velocity and to allow for some hold-up time. Hold-up time is needed for heat and mass transfer. Turbulent flow conditions are needed to mix the phases.

A reasonable distribution or spread of liquid across the reactor cross section must be achieved at the exit or outlet of the mixer. Even if a distribution tray is located below the mixer, a certain liquid spread over the cross section of the reactor is needed at the mixer exit or outlet to prevent excessive liquid level gradients on the distribution tray. For instance, a mixer design exiting all liquid to one side of the reactor would not be acceptable.

Furthermore, the overall mixer height is important. The mixer should be as compact as possible to reduce the height requirement of the reactor/vessel. In a hydrotreating or hydrocracking reactor, room taken up by the mixer cannot be utilized for the active catalyst. A given total volume of catalyst is required in order to convert the reactants into the desired products. Therefore the space occupied by the mixer adds to the required reactor size/height. Hydrocracking reactors are designed for operation up to 200 bar and 450° C., with high partial pressures of both hydrogen and hydrogen sulfide. Typically, the reactors are designed with internal diameters up to 5 meters. Due to the severe design conditions, the hydrocracking reactor has a thick shell, which is typically constructed of 2.25 Cr 1.0 Mo steel, with an internal lining of austenitic stainless steel such as 347 SS. The cost of one meter of reactor straight side is therefore high, and there is a large potential saving from more compact mixer designs.

The type 1 mixers with inlet chutes are among the most commonly used mixer designs in commercial hydrotreating and hydrocracking applications today. These mixers typically employ sloped inlet chutes, and the major part of the mixer pressure drop occurs in the inlet chutes. If properly designed, high flow velocity and a dispersed flow regime will exist in the inlet chutes. The dispersed flow results in a large interphase area available for heat and mass transfer between the liquid phase and the vapor phase. The high velocity also results in a high degree of turbulence downstream from the inlet chutes, which again results in good mixing. Further, the high velocity results in high mass transfer and heat transfer coefficients for heat and mass transfer between the liquid and vapor phases.

The inlet chutes represent parallel flow paths, and the entire process stream is not contacted in the inlet chutes. Therefore, the swirl box of the mixer must be sized to allow for a sufficient number of fluid rotations in order to mix the streams from the different inlet chutes with each other.

The fluid entrance angle $\alpha$ between the flow direction of the fluids entering the swirl box from the inlet chutes and the tangential direction is defined in FIG. 2C. The larger $\alpha$ is, the lower the momentum that is available to establish the swirling motion inside the swirl box, and the lower the number of fluid rotations that is achieved in the swirl box. For many vortex mixer designs of the prior art, the angle $\alpha$ is excessive, and this reduces the number of fluid rotations in the swirl box to the detriment of the mixing performance of the device. See, for instance, U.S. Pat. No. 5,837,208, where the use of a vertical section 27 in spillways 26 increases the angle $\alpha$ significantly. This is illustrated in FIG. 2C.

The diameter $D_i$ of the circle of the inlet chutes is defined in FIG. 2B. The diameter $D_o$ of the outlet opening is also defined in FIG. 2B. The number of fluid rotations in the vortex mixer, and thus the mixing performance, strongly depends upon the ratio of $D_i/D_o$. For many vortex mixers of the prior art, $D_i$ is too low. This reduces the diameter ratio $D_i/D_o$ and thus the number of fluid rotations in the swirl box, and thereby diminishing the mixing performance of the vortex mixer.

The mixing box height $H_s$ is defined in FIG. 2A. In order to ensure a sufficient number of rotations in the swirl box, a larger mixing box height, $H_s$, will have to be used to compensate for a large $\alpha$ and/or a low $D_i/D_o$ ratio. As a result, the inter-bed mixer will occupy a larger volume of the reactor, and the size of the reactor vessel will have to be increased, resulting in significant additional costs.

The vortex mixers are characterized by having a good spread of the liquid exiting the mixer due to the high angular velocity of the exiting liquid. The vortex mixer has good turn down capability, since even small vapor and liquid flow rates are normally sufficient to establish the swirling motion in the swirl box.

In the Type 2 mixers with radial inlet flow, the swirl box is characterized by a radial/horizontal inlet flow. The inlet to the swirl box cause a major part of the pressure drop. If properly designed, the inlets will disperse the liquid to generate a large interphase area for heat and mass transfer between the phases. Again, the inlets represent parallel flow paths, and the number of fluid rotations in the swirl box will have to be sufficient to mix the streams entering through the different inlets with each other.

In the Type 3 mixers, the vapor and the liquid take different paths through slots in the cap. The vapor follows a path in the upper portion of the slots, while the liquid takes a path in the lower portion of the slots. The two phases are not contacted efficiently in these inlets/slots. Also, the pressure drop in the inlets/slots corresponds to the pressure drop of the two-phase column inside the upflow channel. This pressure drop is insufficient for dispersing the liquid into droplets. The slots/inlets represent parallel flow paths and the streams from these parallel flow paths will have to be mixed with each other in the upflow channel. The only way to achieve this is if significant swirling motions are introduced in the upflow channel. But due to the low velocity in the inlets, and due to insufficient size of the upflow channel, it is normally not possible to achieve significant swirling motions in the upflow channel. The only location where the entire process stream is contacted is thus in the downcomer of the bubble cap, which is insufficient for equilibration of the temperature and composition.

In the Type 4 mixers with separate mixing of vapor and liquid, all or part of the entire mixer pressure drop is used in parallel mixers for mixing the vapor and liquid separately. Single phase mixing is widely used in the industry in spite of the fact that the controlling step in two-phase mixing is heat and mass transfer between the vapor and the liquid phases.

Each single phase mixer in itself also consists of parallel flow paths like parallel inlet chutes or vanes. In the mixer disclosed in U.S. Pat. No. 5,635,145, there is no two-phase mixing orifice. As a consequence, the two-phase mixing performance of this type of mixer is poor.

The Type 5 baffled box mixers with vertical flow, exemplified by U.S. Pat. No. 4,223,269, provide good mixing performance and fulfill all the criteria for a proper mixer given above. However, this type of mixer requires very large mixer heights, and thus undesirably large reactor/vessel volumes.

The Type 6 baffled box mixers with horizontal flow, as disclosed in U.S. Pat. No. 3,705,016 and U.S. Pat. No. 3,977,834, represent mixer designs with more parallel fluid paths. In the mixer of U.S. Pat. No. 3,977,834, the entire process stream is never contracted in one mixing orifice. In addition, the liquid exit pattern from the mixer of U.S. Pat. No. 3,705,016 is uneven. The type 6 mixer disclosed in U.S. Pat. No. 5,690,896, is a reasonable good mixer, but it does not have expanded flow area sections to generate turbulence in the expansion and to provide hold up time for heat and mass transfer. Also, the fluids approach the center orifice from only one side. The resulting liquid spread at the mixer exit is uneven. U.S. Pat. No. 7,276, 215 represents a very good and compact mixer design and fulfills all the criteria for proper mixing performance given above. However, the turn down capability of all the type 6 mixers is lower than that of the above-described vortex mixers.

SUMMARY

This disclosure relates broadly to a mixing device of the vortex type, for admixing gas or vapor and liquid in a vessel with concurrently flowing vapor and liquid.

The variables $\alpha$, $D_i$, $D_o$ and $H_s$ have been defined for the disclosure in FIGS. 5A, 5B, and 5C.

One of the main objects of the disclosure is to provide good mixing with a relatively small loss of reactor volume and with relatively low energy requirements. These advantages have been obtained by ensuring a large number of fluid rotations inside the swirl box to allow for equilibration of temperature and composition of the fluids entering the swirl box through the inlets. For a given mixer height and pressure drop, the number of fluid rotations in the swirl box has been maximized by use of the following four principles for proper design of a vortex mixer:

a. Entering the two-phase stream into the swirl box in a direction close to the tangential direction ($\alpha \approx 0$)

b. Letting the ratio $D_i/D_o$ be as large as possible.

c. Entering the two-phase stream into the swirl box through the inlets at a high flow velocity.

d. Avoiding flow obstructions inside the swirl box, such as support beams and structures, flange assemblies, bolts and nuts.

One embodiment of the disclosure includes a flow-obstructing mixing box located between the walls of a cylindrical reactor. The mixing box has one or more inlet openings for essentially vertical fluid flow into the mixer. The mixing box comprises a horizontal circular top wall, a horizontal circular bottom wall, and a vertical cylindrical wall, which may be a segment of the inner wall of the reactor. The horizontal circular bottom wall is provided with an outlet opening. A cylindrical weir extends up above the rim of the outlet opening. In order to maximize $D_i/D_o$ and in order to minimize the height of the mixing box, the diameter of the mixing box is preferably close to or identical to the inner diameter of the reactor. Inside the mixing box, curved baffles are located to form tangential inlet orifices, generating a two-phase stream characterized by having a high flow velocity and a substantially pure tangential flow direction of the fluids entering the swirl box.

In the tangential inlet orifices, the liquid is dispersed into the vapor stream to provide a large interphase area for heat and mass transfer. The high flow velocity in the mixing orifices also results in high heat and mass transfer coefficients and in turbulent conditions upon the expansion of the flow into the swirl box, which provides mixing.

When more than one tangential inlet is used, these inlets represent parallel mixing orifices, and the entire process stream is not contacted at this location. However, the swirl box is sized based on the above-mentioned four principles for proper design of a vortex mixer to allow for a sufficient number of fluid rotations inside the swirl box in order to equilibrate temperature and composition of the streams entering through the tangential inlets.

After having passed through the swirl box, the fluids exit in a vertical direction through the outlet opening in the bottom wall. The liquid still has a significant angular velocity at the exit or outlet of the mixer. The swirling velocity of the liquid results in uniform liquid spread beneath the mixer. Below the opening in the bottom wall, an impingement plate is located to break down the high velocity of the two-phase jet and to further spread the liquid over the cross section of the reactor.

Quench fluid may be added upstream from the tangential inlet orifices, either above the top wall, or between the top and bottom walls.

While conventional vortex mixers do not fulfill the four principles listed above for proper design of a vortex mixer, a vortex mixer in accordance with the present disclosure does. Compared to the conventional vortex mixer types, vortex mixers in accordance with the present disclosure have improved mixing performance in terms of achieving an outlet stream from the mixer, which is equilibrated regarding temperature and composition. Further, obeying the four principles of proper design of a vortex mixer results in a significantly reduced height requirement compared to conventional vortex mixers.

BRIEF DESCRIPTION OF THE DRAWINGS

FIG. 2B is a simplified overhead view along line A-A of FIG. 2A of the swirl box of the vortex mixer of FIG. 2A, showing the variable dimensions $D_i$ and $D_o$.

FIG. 2C is a cross-sectional view of the inlet chutes taken along line B-B in FIG. 2B, showing the angle $\alpha$.

FIGS. 4A, 5A, and 6A are overhead plan views of alternative embodiments of the present disclosure.

FIGS. 4B, 5B, and 6B are the corresponding cross-sectional views taken along the lines A-A of FIGS. 4A, 5A, and 6A, respectively.

FIGS. 4C, 5C, and 6C are the corresponding cross-sectional views taken along the lines B-B in FIGS. 4A, 5A, and 6A, respectively.

Figure 1A:
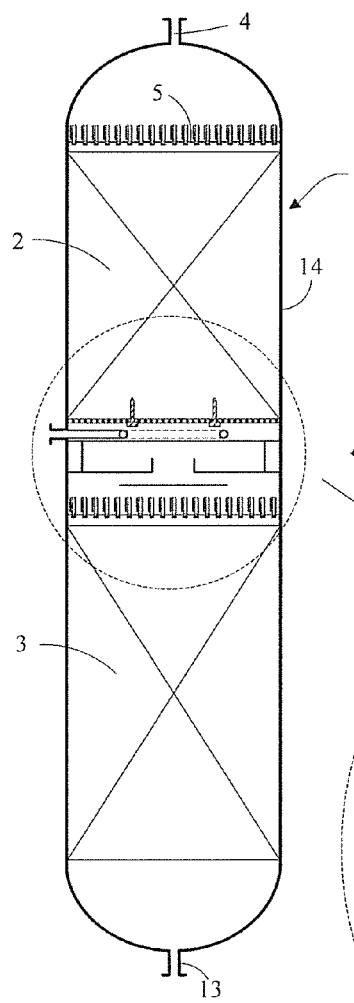
FIG. 1A is a simplified longitudinal cross-sectional view showing a typical layout of catalyst and internals in a hydroprocessing reactor with two beds of solid catalyst particles, with a mixing device located between two adjacent catalyst beds inside the reactor.

Alternative embodiments of the present disclosure include, but are not limited to, the designs shown in the figures.

DETAILED DESCRIPTION

The reactions taking place in hydroprocessing reactors are exothermic. Heat is therefore released during reaction, causing the temperature to rise when the reactants are converted to products in the presence of a hydroprocessing catalyst at elevated temperature and pressure.

In commercial hydroprocessing reactors, the two-phase mixture of reactants flows through a bed of solid catalyst particles. The ideal flow pattern in such a reactor is a plug flow where liquid is flowing downwards with the same velocity (based on an empty reactor) at all points of the reactor cross-section. In the ideal plug flow case, the same is true for the vapor phase: The vapor is flowing downwards with identical velocity (based on an empty reactor) at all points of the reactor cross-section.

In commercial reactors, plug flow is never achieved due to non-ideal distribution trays, uneven catalyst loading, and/or the presence of deposits/coke in the void space between the catalyst particles. Therefore, in some areas of the catalyst bed, the liquid flow velocity is higher than average, and the vapor velocity is lower than average. Due to the high heat capacity of the liquid relative to the vapor, the temperature rise (as may be expressed in ° C. per meter of flow path) is low in these areas. Similarly, in other areas of the catalyst bed, the liquid flow velocity is lower than average and the vapor velocity is higher than average. Again, due to the high heat capacity of the liquid relative to the vapor, the temperature rise in ° C. per meter of flow path is high in these areas.

As a result, even though the reactant mixture has a uniform temperature at the reactor inlet, some areas of the catalyst bed get hotter than others as the fluids pass through the bed. Further, since the rate of reaction is increasing with increased temperature, this effect tends to accelerate. The hot areas of the catalyst bed have a high rate of reaction, and even more heat is released in these areas than in the cold areas.

Due to the difference in rate of reaction between the hot areas and cold areas of the catalyst bed, the fluids develop differences in their chemical compositions.

The non-uniformity in temperature and chemical composition in a horizontal plane has several negative effects:

All hydroprocessing catalysts deactivate during operation. In order to compensate for the decline in activity of the catalyst, the average bed temperature is increased during the run. At some point in time, at end-of-run, the peak temperature in the catalyst bed reaches its maximum allowable value. At this point, the entire process unit needs to be shut down, and the catalyst must be regenerated or replaced. If there is non-uniformity in temperature in the horizontal plane, the end-of-run will occur at an earlier stage and at a lower average bed temperature. The higher frequency of shut-downs caused by non-uniform temperatures adds significant cost to the refiner in terms of lost production, catalyst consumption and additional labor.

Another effect of the non-uniformities is that the degree of chemical conversion is uneven. A fraction of the reactants will be converted to a high extent while the remaining fraction of the reactants is converted to a lower extent. The result is often lower overall product quality.

A first example is a diesel hydrotreating reactor where sulfur containing hydrocarbon components (organic sulfur components) and $H_2$ are converted to sulfur free hydrocarbon components and $H_2S$. If non-uniform temperatures exist, then a fraction of the feed oil is reacted at higher temperature and maybe also at lower space velocity due to lower liquid velocity as discussed above. Another fraction of the feed oil is reacted at lower temperature and maybe also higher space velocity due to higher liquid velocity. The result is that the organic sulfur components tend to "by-pass" the catalyst bed through the areas with low temperature and high space velocity. This bypass significantly increases the content of organic sulfur components in the overall product. In order to meet the product specification on organic sulfur content, the refiner needs to reduce the feed rate or increase the reactor operating temperature to compensate for the non-uniform temperatures and composition. Reducing the feed rate has a significant cost in terms of lost production. Increasing the reactor temperature results in increased energy consumption and reduced run length with increased frequency of shutdowns for catalyst generation/replacement. As discussed above, the increased frequency of shutdowns has significant costs.

A second example is a hydrocracking reactor where heavier hydrocarbon components and $H_2$ are converted to lighter hydrocarbon components. Again if non-uniform temperatures exist then a fraction of the feed oil is reacted at higher temperature and maybe also at lower space velocity due to lower liquid velocity. Another fraction of the feed oil is reacted at lower temperature and maybe also higher space velocity due to higher liquid velocity. The result is that part of the heavy feed oil is "overcracked", so that the production of unwanted $C_1$-$C_4$ gasses and light naphtha components is significantly increased while another part of the heavy feed oil is only converted to a low extent. The selectivity of the hydrocracking unit towards the desired product is thus reduced, and the overall conversion of the heavy feed components to lighter product components is also reduced. Both effects are associated with significant costs to the refiner.

Non-uniformities in temperature and chemical composition in the horizontal plane of a catalyst bed are unavoidable in commercial hydroprocessing reactors. However, the non-uniformities can be minimized by installing suitable reactor internals.

For the first catalyst bed, which the feed/reactants first enters, a good inlet distributor needs to be provided to ensure equal distribution of the liquid and vapor over the cross section of the reactor. The fluids entering this distributor need to be properly mixed upstream from the distributor to ensure that compositional and thermal equilibrium has been achieved. Sufficient mixing of the fluids is most often provided in the piping routing the reactants to the reactor.

For any subsequent catalyst bed(s), a good distributor is also needed to ensure uniform distribution of the liquid and vapor over the cross section of the reactor. However, the inlet stream to a subsequent catalyst bed is the outlet stream from an upstream catalyst bed where a non-uniform temperature and chemical composition will exist at the bed outlet. Therefore, it is essential to have a mixing device located between the upstream catalyst bed and the distributor. Otherwise, the non-uniformity in temperature and chemical composition may proceed from one bed to the next and worsen. The purpose of the mixing device is to produce an outlet stream that is equilibrated regarding temperature and composition.

A quench fluid, which is colder than the fluids inside the reactor, is often injected into the hydroprocessing reactor between two adjacent catalyst beds in order to cool down the hot effluent from one catalyst bed before the fluids enter the next bed. This allows for operation of the reactor closer to isothermal conditions, which has several benefits in terms of increased run length and improved product quality. A further objective of the mixing device in this case is to mix the cold quench stream with the effluent from one catalyst bed to achieve thermal and compositional equilibrium before the stream enters the next catalyst bed.

Figure 1B:
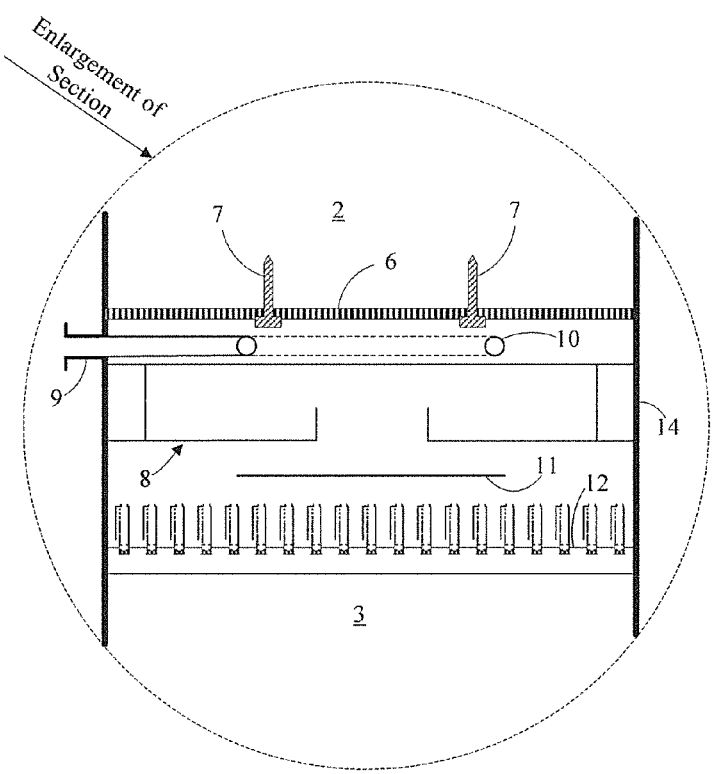
FIG. 1B is an enlarged, detailed view of the structure within the broken outline of FIG. 1A.

Referring now to the drawings, FIGS. 1A and 1B show a typical hydroprocessing reactor 1 with a side wall 14 and with first and second beds of catalyst particles 2 and 3, respectively. FIG. 1A is intended to define the typical location of the mixing device relative to the catalyst beds and to other reactor internals. The reactants enter the reactor through an inlet nozzle 4. The fluids then enter a first or top distribution tray 5, which distributes the vapor and liquid evenly over the cross section of the reactor before the fluids enter the first or upper catalyst bed 2 which rests on a screen or catalyst support grid 6, as shown in FIG. 1B. Large forces are normally acting on the catalyst screen or support grid 6 due to the large weight of the catalyst and due to the forces introduced by the fluid flow through the catalyst bed. Therefore, support beams 7 are normally required to absorb these forces. A mixing device 8 is located below the catalyst support system 6, 7. Quench fluid may be added through a quench nozzle 9 and a quench distributor 10. An impingement device or plate 11, for spreading the liquid and for breaking down the high velocity of the jet exiting the mixing device 8 is located below the mixing device 8. A second or bottom distribution tray 12, located beneath the mixing device 8, distributes the vapor and liquid evenly over the cross section of the reactor before the fluids enter the second or lower catalyst bed 3. The product from the reactor exits through an outlet nozzle 13.

More than two catalyst beds may also be used. The number of mixing devices 8 is typically N-1 where N is the number of catalyst beds in the reactor.

Figure 2A:
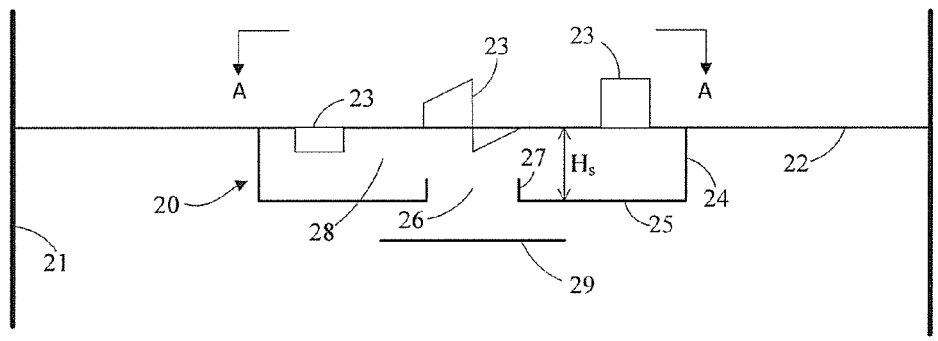
FIG. 2A is a simplified side sectional view of a reactor vessel with a vortex mixer of the prior art, showing the variable dimension ft.

FIG. 2A is a simplified side sectional view of a reactor vessel with a conventional vortex mixer 20 of the prior art. An overhead view A-A of the swirl box of this vortex mixer is shown in FIG. 2B and a side sectional view of an inlet chutes taken along segment B-B in FIG. 2B is shown in FIG. 2C. The reactor vessel has walls 21, and a collection tray 22 is installed in the reactor. The collection tray 22 forces the vapor and liquid to flow through a plurality of inlet chutes 23. The vortex mixer has a cylindrical side wall 24, a bottom wall 25 with an outlet opening 26, and a cylindrical weir 27. Together with collection tray 22, these walls form a swirl box 28. An impingement plate 29 is located below the outlet opening 26. The height $H_s$ shown in FIG. 2A is the free height between the collection tray 22 and the bottom wall 25. The center of the inlet chutes 23 forms a circle, and $D_i$, shown in FIG. 2B, is the diameter of this circle. $D_o$, shown in FIG. 2B, is the diameter of the outlet opening 26. The angle a is defined in FIG. 2C as the angle between the flow path of the fluids exiting the inlet chute 23 and the tangential direction, which may be defined as the direction parallel to the bottom wall 25.

The influence of $\alpha$, $D_i$, $D_o$ and $H_s$ on the number of fluid rotations in the swirl box is now demonstrated for a mixer in a commercial hydrocracking reactor. The data for the commercial mixer are given in Table 1.

TABLE 1

Example of data for commercial mixer

| Reactor type | Hydrocracking |
|---|---|
| Reactor inner diameter, mm | 5000 |
| Liquid flow to mixer, actual m³/h | 630 |
| Liquid density, kg/m³ | 460 |
| Liquid viscosity, cP | 0.15 |
| Liquid surface tension, dynes/cm | 7.5 |
| Vapor flow to mixer, actual m³/h | 6200 |
| Vapor density, kg/m³ | 18.5 |
| Vapor viscosity, cP | 0.021 |

Figure 3A:
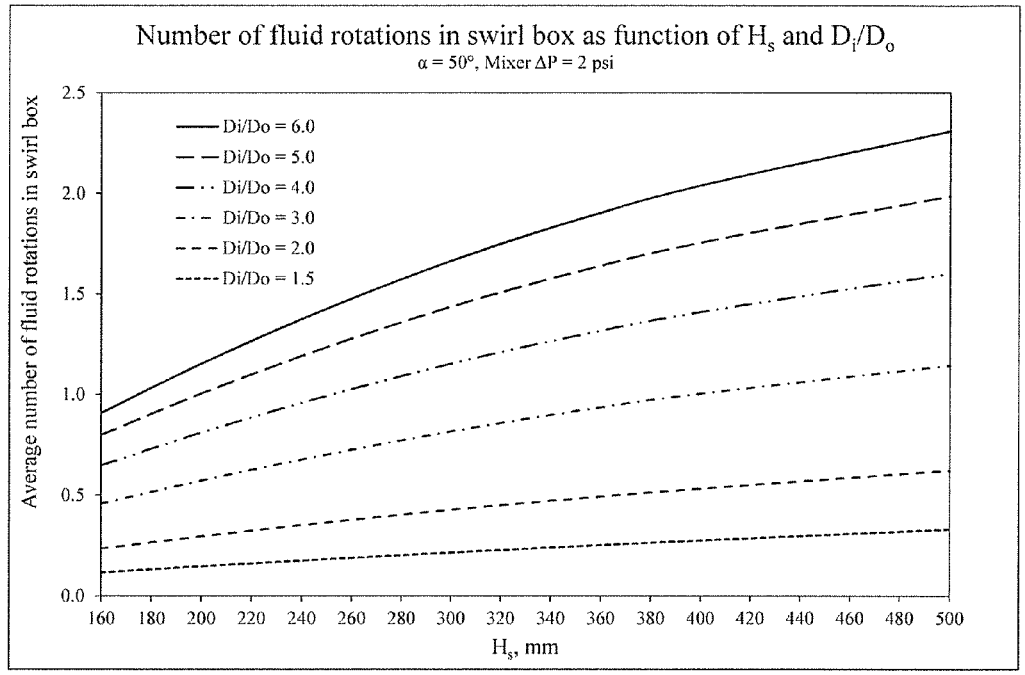
FIGS. 3A and 3B are graphs showing the average number of swirl box fluid rotations as a function of $H_s$ and $D_i/D_o$ for two different values of $\alpha$.
Figure 3B:
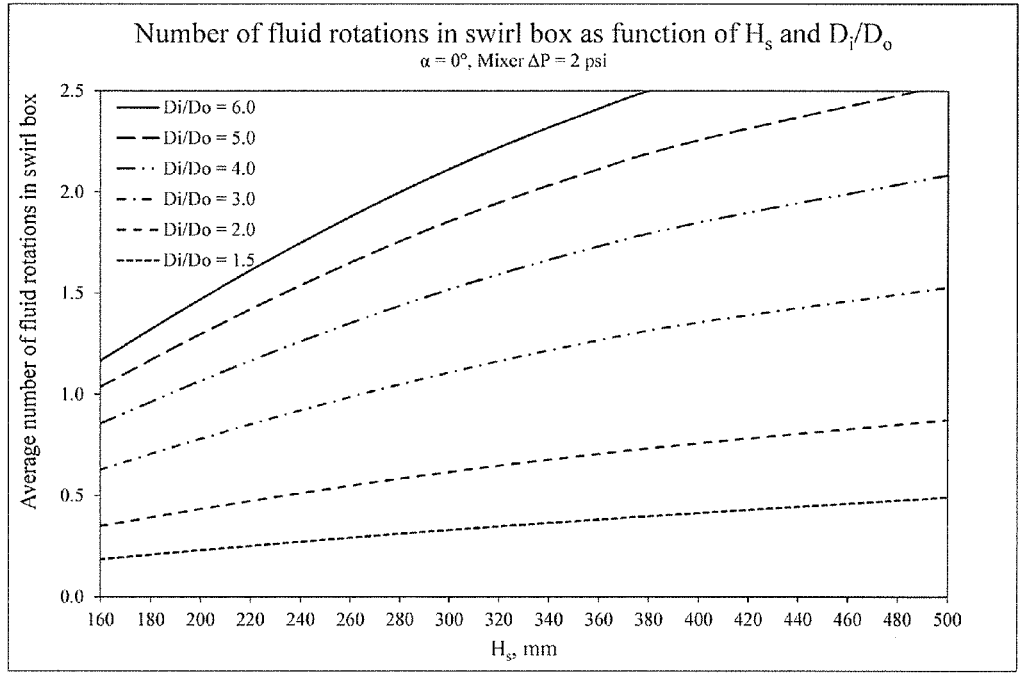

In FIGS. 3A and 3B, the simulated average number of fluid rotations in the swirl box of the commercial mixer sized for the data in table 1 is shown as a function of $H_s$ and $D_i/D_o$ for $\alpha=50°$ and $\alpha=0°$ respectively. In all cases, the mixer has been sized to obtain a total pressure drop of 2 psi. As can be seen from FIGS. 3A and 3B, the number of fluid rotations in the swirl box strongly depends on both $\alpha$ and $D_i/D_o$. Design of mixers with $D_i/D_o$ of about 2 and $\alpha$ of about 50°, as seen in many prior art commercial designs, only result in about one half rotation (at $H_s$ as high as 500 mm) in the swirl box. This is clearly insufficient to mix the streams entering the swirl box from the different inlet chutes with each other. $D_i/D_o$ must be maximized and $\alpha$ must be minimized in order to maximize the number of fluid rotations for a given mixer height and a given mixer pressure drop.

The flow velocity in the inlets to the swirl box must be sufficiently high to disperse the liquid into droplets. For the normal operating conditions in hydrotreating and hydrocracking reactors, the dispersed flow regime will be entered when the superficial vapor velocity is larger than roughly:

$$V_v^{Dispersed} = 1.08 \frac{m}{s} \times \sqrt{\frac{\rho_L}{\rho_v}} \qquad \text{a}$$

Where: $V_v^{Dispersed}$ is superficial vapor flow velocity resulting in dispersed flow, and $\rho_L$ is the actual liquid density in kg/m³, and $\rho_v$ is the actual vapor density in kg/m³

The superficial vapor flow velocity is defined as the actual volumetric vapor flow rate through the flow channel divided by the cross sectional area of the flow channel.

The present disclosure relates to a vortex type mixer where $D_i/D_o$ has been maximized, and $\alpha$ approaches 0°. In addition, the flow velocity in the tangential inlets of the mixer is high enough for dispersion of the liquid into droplets, according to above equation (a), and the mixer is constructed to avoid flow obstructions in the swirl box, such as support beams and structures, flange assemblies, bolts and nuts.

FIGS. 4A, 5A, and 6A represent alternative structures of the mixing device according to the present disclosure. The figures are presented only to characterize the disclosure and alternatives. They are not intended to limit the scope of the concepts disclosed herein or to serve as working drawings. They should not be construed as setting limits on the scope of the inventive concept. The relative dimensions shown by the drawings should not be considered equal or proportional to commercial embodiments.

FIG. 4A is an overhead view of a mixing box 30. FIG. 4B is a sectional view along line A-A in FIG. 4A, and FIG. 4C is a sectional view along line B-B in FIG. 4A. The mixing box 30 comprises a horizontal circular top wall 31, a horizontal circular bottom wall 32, and a vertical cylindrical side wall 33. The vertical cylindrical side wall 33 is preferably constituted by a section of the reactor wall 14, in order to maximize the diameter of a swirl box or chamber 40 defined by the top wall 31, the bottom wall 32, and the side wall 33. The top wall 31 is provided with one or more inlet openings 34. Inside the mixing box 30, curved baffles 35 are located to form tangential inlet orifices 36. The bottom wall 32 is provided with a central outlet opening 37 and a vertical cylindrical weir 38. Below the outlet opening 37 an impingement plate 39 is located.

The intended flow through the mixing device 30 is indicated by arrows in FIGS. 4A, 4B, and 4C. During operation, the vapor and liquid exiting the first or upper catalyst bed 2 will flow through the inlet openings 34. These fluids will then take a 90° turn and pass through the tangential inlet orifices 36 and into the swirl box 40. Cold quench fluid may be added between the first or upper catalyst bed 2 and the inlet openings 34. The flow velocity in the tangential inlet orifices 36 is high, and the liquid is dispersed into the vapor. The stream from the tangential inlet orifices 36 enters the swirl box 40 in a pure (or nearly pure) tangential direction ($\alpha=0°$), and the high momentum of the stream is utilized to generate a violent swirling flow in the swirl box 40, where the streams from the tangential inlet orifices are efficiently mixed with each other. After having swirled in the swirl box 40, the fluids flow over the weir 38 and down through the outlet opening 37. The liquid still has a significant angular velocity while leaving the outlet opening 37. This angular velocity improves the spread of liquid onto the bottom distribution tray 12. The impingement plate 39 ensures that the fluids exit the mixer 30 in an outward radial direction. The impingement plate 39 prevents the mixer 30 from sending a high velocity jet directly towards the bottom distributor tray 12. Such a jet would disturb the liquid level on the bottom distribution tray 12, and it would entrain the liquid. The impingement plate 39 will further improve the spread of liquid across the cross section of the reactor before the fluids encounter the bottom distribution tray 12.

The baffles 35 in the mixing device 30 can have many different shapes. They can be semicircular, oval, straight, curved, angled etc. The baffles do not need to be purely vertical, but it is sufficient that the baffles have a vertical component. The inlet and outlet openings 34 and 37 may also have different shapes, such as ellipsoidal, circular, rectangular, triangular etc. There may be one or more inlet openings and outlet openings respectively. The horizontal cross section of the mixing device 30 itself can have any shape. It can be circular as for the mixer in FIG. 4A. It can also be ellipsoidal, triangular, rectangular, polygonal etc. A circular or polygonal shape with many sides is preferred in order to minimize the flow resistance for the swirling fluid motion and thus maximize the number of fluid rotations in the swirl box.

The vertical cylindrical weir 38 in FIG. 4A may have different shapes, such as ellipsoidal, circular, rectangular, triangular, polygonal etc., and it may be provided with perforations or apertures. The upper rim of the weir 38 does need to be straight, and it may be provided with holes, slots, notches etc. The use of a weir 38 normally improves the turndown capability of the mixer, but the weir 38 may be excluded in order to simplify the design.

As mentioned, quench fluid may be injected upstream from the inlet openings 34. However, in order to reduce the overall reactor height, the quench fluid can also be injected downstream from the inlet openings, between the top plate 31 and the bottom plate 32.

An example of a mixer, according to the present disclosure, with one tangential inlet orifice, with quench fluid injection between the top and the bottom plates, with angled baffles, and with no vertical cylindrical weir at the outlet opening, is shown in FIGS. 5A, 5B, and 5C. FIG. 5A is an overhead view of a mixing device 50. FIG. 5B is a sectional view along line A-A in FIG. 5A and FIG. 5C is a sectional view along line B-B in FIG. 5A. The mixing device 50 comprises a horizontal circular top wall 51, a horizontal circular bottom wall 52, and a vertical cylindrical side wall 53. The vertical cylindrical side wall 53 is preferably constituted by a section of the reactor wall 14, in order to maximize the diameter of a swirl box or chamber 59 defined by the top wall 51, the bottom wall, 52, and the side wall 53. The top wall 51 is provided with an inlet opening 54. Inside the mixing device 50, angled baffles 55 are located to form a single tangential inlet orifice 56. A perforated quench fluid distributor 60 is located between the top wall 51 and the bottom wall 52 upstream the tangential inlet orifice 56. The bottom wall is provided with a central outlet opening 57. An impingement plate 58 is located below the outlet opening 57.

The benefit of using only one tangential inlet orifice 56 is that the entire process stream is contacted in this inlet orifice. Differences in temperature and chemical composition can thus be equilibrated much more efficiently than in mixers with several parallel inlet orifices, where the entire process stream is not contacted in the inlet orifice, but only later in the swirl box.

The intended flow through the device 50 is indicated by arrows in FIGS. 5A, 5B, and 5C. During operation, the vapor and liquid exiting the first or upper catalyst bed 2 will flow through the inlet opening 54. The fluids will then take a 90° turn. Cold quench fluid is injected through a quench fluid distributor 60. After the cold quench fluid has been added, the entire process stream will flow through the tangential inlet orifice 56 and into the swirl box 59 at high velocity and with dispersion of the liquid into droplets. The stream from the tangential inlet orifice 56 enters the swirl box 59 in an almost tangential direction ($\alpha \approx 0°$), and the high momentum of the stream is utilized to generate a violent swirling flow in the swirl box 59. After having swirled in the swirl box, the fluids flow through the outlet opening 57. The liquid still has a significant angular velocity while leaving the outlet opening 57. This angular velocity improves the spread of liquid onto the bottom distribution tray 12. The impingement plate 58 ensures that the fluids exit the mixer in an outward radial direction. The impingement plate 58 prevents the mixer from sending a high velocity jet directly towards the bottom distribution tray 12. Such a jet would disturb the liquid level on the bottom distribution tray 12, and it would entrain the liquid. The impingement plate 58 will further improve the spread of liquid across the cross section of the reactor before the fluids encounter the bottom distribution tray 12.

The impingement plate 39, 58 is shown as a solid plate in FIGS. 4B and 5B, respectively. The impingement plate may have any shape, such as circular, ellipsoidal, rectangular, polygonal etc. The impingement plate does not need to be planar; a non-planar impingement plate may be used. The impingement plate may be provided with perforations, apertures, chimneys and/or weirs for rough distribution of the liquid to the bottom distribution tray 12, as long as the impingement plate effectively decreases the high velocity of the fluids exiting the mixer. A concave impingement plate may often reduce the required height between the mixing device 8 and bottom distribution tray 12 in FIG. 1B. The reason is that for a given height between mixing device 8 and bottom distribution tray 12, a concave impingement plate can provide larger flow area for outward radial flow below the rim of the outlet opening, and at the same time a larger flow area for inward radial flow below the rim of the impingement plate. Large flow areas are required at these locations in order to minimize the pressure differences in the vapor space above bottom distribution tray 12, and to allow for separation of the vapor and liquid on the bottom distribution tray 12.

The shapes of the tangential inlet orifices 36 in FIG. 4C and 56 in FIG. 5C are shown as rectangular. The tangential inlet orifices may have many different shapes, such as ellipsoidal, circular, rectangular, triangular, polygonal etc. Also the tangential inlet orifice does not need to take up the entire height between the top plate 31, 51 and the bottom plate 32, 52.

An example of a mixer, according to the present disclosure, where the tangential inlet orifices do not take up the entire height between the top plate and the bottom plate is shown in FIGS. 6A, 6B, and 6C. FIG. 6A is an overhead view of a mixing device 70. FIG. 6B is a sectional view along line A-A in FIG. 6A, and FIG. 6C is a sectional view along line B-B in FIG. 6A. The mixing device 70 comprises a horizontal circular top wall 71, a horizontal circular bottom wall 72, and a vertical cylindrical side wall 73. The vertical cylindrical side wall 73 is preferably constituted by a section of the reactor wall 14, in order to maximize the diameter of a swirl box or chamber 82 defined by the top wall 71, the bottom wall 72, and the side wall 73. The top wall 71 is provided with four inlet openings 74. Inside the mixing device 70, curved walls 75, lower walls 76, and sloped walls 77 are located to form four tangential inlet orifices 78. The bottom wall 72 is provided with a central outlet opening 79 and a vertical cylindrical weir 80. A concave and perforated impingement plate 81 is located below the outlet opening 79.

The intended flow through the device 70 is indicated by arrows in FIGS. 6A, 6B, and 6C. During operation, the vapor and liquid exiting the first or top catalyst bed 2 flows through the inlet openings 74. The fluids then take a 90° turn and pass through the tangential inlet orifices 78 and into the swirl box 82. Cold quench fluid may be added between the first or upper catalyst bed 2 and the inlet openings 74. The flow velocity in the tangential inlet orifices 78 is high, and the liquid is dispersed into the vapor. The stream from the tangential inlet orifices 78 enters the swirl box 82 in a pure (or nearly pure) tangential direction ($\alpha=0°$), and the high momentum of the stream is utilized to generate a violent swirling flow in the swirl box 82, where the streams from the tangential inlet orifices 78 are efficiently mixed with each other. After having swirled in the swirl box 82, the fluids flow over the weir 80 and down through the outlet opening 79. The liquid still has a significant angular velocity while leaving the outlet opening 79. This angular velocity improves the spread of liquid onto bottom distribution tray 12. The impingement plate 81 ensures that the fluids exit the mixer 70 in an outward radial direction. The impingement plate 81 prevents the mixer 70 from sending a high velocity jet directly towards the bottom distribution tray 12. Such a jet would disturb the liquid level on the bottom distribution tray 12, and it would entrain the liquid. The impingement plate 81 will further improve the spread of liquid across the cross section of the reactor before the fluids encounter the bottom distribution tray 12.

Referring again to FIGS. 1A and 1B, the catalyst support system comprises the catalyst screen 6 and the support beams 7. The catalyst support system and the mixing device 8 are shown to be separate structures. However, the mixing device 8 of the present disclosure may be built as an integral part of the catalyst support system 6, 7.

The mixing box itself normally requires support beams or other structures to absorb the forces caused by the pressure drop across the mixing box. These support beams or structures are not shown in any of the figures, but may be located above or below the mixing box, or they may be an integral part of the mixing box and flow baffles.

For any of the embodiments of the present disclosure, low capacity drain holes may be provided.

The metal plates that are used to fabricate the mixers 30, 50, and 70 may be unitary, but they are normally assembled of several plate sections to allow for passage of the parts through the inlet nozzle 4. Normally, the mixer will comprise several removable sections for easy access during inspection and cleaning procedures, and to provide human access through the mixing box 30, 50, and 70.

The mixing boxes 30, 50, and 70 are typically close to horizontal, meaning that the overall slope of the mixing boxes from one side of the reactor 1 to another is small. The diameter of the mixing boxes 30, 50, and 70 is typically between 50% and 100% of the inner diameter of the reactor 1, preferably as large as possible and preferably 100%. The combined cross sectional area of the tangential inlet orifices is selected to obtain a superficial vapor flow velocity exceeding $V_v^{Dispersed}$ defined in the above equation (a). The angle α between the flow direction in the inlet orifice and the tangential direction is typically less than 25°, such as, for example, less than 15°, and preferably close to 0°. The ratio of the inlet diameter to the outlet opening diameter $D_i/D_o$ is typically larger than 2, and preferably larger than 3. The height of the swirl box $H_s$ is selected to achieve at least one full average fluid rotation in the swirl box (360°), and preferably at least 1.5 average fluid rotations (540°). The height of the swirl box $H_s$ may vary from below 100 mm for small diameter reactors to above 500 mm for large diameter reactors.

The above-described embodiments are exemplary only. Other embodiments within the scope of this disclosure may suggest themselves, as well as variations and modifications of such embodiments. Such further embodiments, variations, and modifications, as well as equivalents thereof, are to be considered within the spirit and the scope of the disclosure.

The invention claimed is:

1. A method for admixing vapor and liquid flowing concurrently in a catalytic reactor between an upper catalyst bed and a lower catalyst bed thereof, the method comprising the steps of:

providing a swirl box comprising a top wall, a side wall and a bottom wall; an outlet opening in the bottom wall; and at least one tangential inlet orifice configured for entry of said vapor and liquid into said swirl box in a tangential direction defined as a direction substantially parallel to said bottom wall;

passing said vapor and liquid from a space above said swirl box through said at least one tangential inlet orifice and into said swirl box at a location near said side wall and in a direction close to a flow direction of the swirling vapor and liquid inside the swirl box adjacent the at least one tangential inlet orifice;

rotating said vapor and liquid around said outlet opening during a residence time inside said swirl box to provide mixing of said vapor and liquid; and passing said vapor and liquid from said swirl box through said outlet opening to a space below said swirl box.

2. The method according to claim 1, wherein said side wall and said at least one tangential inlet orifice are located near an outer wall of said catalytic reactor to maximize the distance from said at least one tangential inlet orifice to said outlet opening so as to increase the number of fluid rotations in said swirl box.

3. The method according to claim 1, wherein said side wall is a section of an outer wall of said catalytic reactor, and wherein said at least one tangential inlet orifice is located adjacent to said outer wall of said catalytic reactor so as to increase the number of fluid rotations in said swirl box.

4. The method according to claim 1, wherein said at least one tangential inlet orifice has a flow-through area relative to the flow rate of said vapor such that a superficial vapor flow velocity in the at least one tangential inlet orifice exceeds $V_v^{Dispersed}$ as defined in equation (a)

$$V_v^{Dispersed} = 1.08 \frac{m}{s} \times \sqrt{\frac{\rho_L}{\rho_v}} \qquad (a)$$

during at least one operational phase of said reactor, for dispersion of the liquid into the vapor and/or the vapor into the liquid and for introducing a swirling flow inside said swirl box.

5. The method according to claim 1, wherein said swirl box includes at least first and second tangential inlet orifices, and wherein said swirl box is sized to allow said vapor and liquid to rotate at least 360° on average around said outlet opening before said vapor and liquid exit said swirl box though said outlet opening so as to mix the vapor and liquid entering said swirl box through said first and second tangential inlet orifices, respectively.

6. The method according to claim 1, wherein a substantially vertical weir is attached to the rim of said outlet opening and extends up into said swirl box.

7. The method according to claim 1, wherein said top wall and said bottom wall are substantially horizontal, and said side wall is substantially vertical.

8. The method according to claim 1, wherein an impingement plate is located underneath said outlet opening and is configured to decrease the velocity of the vapor and liquid exiting said swirl box through said outlet opening.

9. The method according to claim 8, wherein said impingement plate includes a structure selected from the group consisting of one or more of perforations, apertures, chimneys, and weirs configured to improve the rough distribution of liquid to a final distributor tray.

10. The method according to claim 8, wherein said outlet opening includes a first rim, and said impingent plate has a second rim, and wherein said impingement plate is concave so as to increase a first area for outward radial flow of said vapor and liquid below the first rim, and so as to increase a second area for inward radial flow of said vapor and liquid below the second rim.

11. A mixing device for use in a catalytic reactor and arranged between an upper catalyst bed and a lower catalyst bed thereof for admixing vapor and liquid flowing concurrently inside said reactor through said upper and lower catalyst beds, said mixing device comprising:
- a swirl box comprising a top wall, a side wall and a bottom wall;
- at least one passageway configured for conducting a concurrent flow of said vapor and liquid in said reactor from a space above said swirl box into said swirl box in a tangential direction defined as a direction substantially parallel to said bottom wall;
- at least one tangential inlet orifice located in said at least one passageway and configured for high velocity injection of said vapor and liquid into said swirl box, said at least one tangential inlet orifice having a flow-through area relative to the flow rate of said vapor such that a superficial vapor flow velocity in said at least one tangential inlet orifice exceeds $V_v^{Dispersed}$ as defined in equation (a)

$$V_v^{Dispersed} = 1.08 \frac{m}{s} \times \sqrt{\frac{\rho_L}{\rho_v}} \qquad (a)$$

during at least one operational phase of said reactor, for dispersion of the liquid into the vapor and/or the vapor into the liquid, and for introducing a swirling flow inside said swirl box, said at least one tangential inlet orifice having an orientation resulting in a flow velocity vector of said injected vapor and liquid that is substantially parallel to a flow direction of the vapor and liquid inside the swirl box at the point of injection of said vapor and liquid; and
an outlet opening in said bottom wall configured for conducting a concurrent flow of said vapor and liquid from said swirl box to a space below said swirl box.

12. The mixing device according to claim 11, wherein said outlet opening has a rim, and wherein the distance from the center of said at least one tangential inlet orifice to the center of said outlet opening is larger than two times the distance from the center of said outlet opening to said rim.

13. The mixing device according to claim 11, wherein said outlet opening has a rim, and wherein a substantially vertical weir is attached to said rim and extends up and into said swirl box.

14. The mixing device according to claim 11, wherein said top wall and said bottom wall are substantially horizontal and said side wall is substantially vertical.

15. The mixing device according to claim 11, wherein said outlet opening is circular.

16. The mixing device according to claim 11, wherein said top wall and said bottom wall are circular.

17. The mixing device according to claim 11, wherein said side wall is cylindrical.

18. The mixing device according to claim 11, wherein said side wall is a section of an outer wall of said reactor.

19. The mixing device according claim 11, wherein the at least one tangential inlet orifice is located on a circle of a diameter, $D_i$, wherein the outlet opening defines a circle with a diameter $D_o$, and wherein the ratio $D_i/D_o$ is larger than 2.

20. The mixing device according to claim 11, where an impingement plate is located below said outlet opening and is configured to decrease the velocity of the mixture stream.

21. The mixing device according to claim 20, wherein said impingement plate is provided with a structure selected from the group consisting of one or more of perforations, apertures, chimneys, and weirs configured to improve a rough distribution of liquid to a final distributor tray.

22. The mixing device according to claim 20, wherein said outlet opening has a first rim and said impingement plate has a second rim, and wherein said impingement plate is concave so as to increase a first area for outward radial flow of said vapor and liquid below the first rim and to increase a second area for inward radial flow of said vapor and liquid below the second rim.

23. The mixing device according to claim 11, wherein said catalytic reactor is a vertical hydroprocessing reactor with a downward concurrent flow of vapor and liquid in which hydrocarbons are reacted with hydrogen-rich gas in the presence of a hydroprocessing catalyst.

24. A method for admixing vapor and liquid flowing concurrently in a catalytic reactor between an upper catalyst bed and a lower catalyst bed thereof, the method comprising the steps of:
providing a swirl box comprising a top wall, a side wall and a bottom wall; an outlet opening in the bottom wall; and at least one tangential inlet orifice configured for entry of said vapor and liquid into said swirl box, wherein said side wall is a section of an outer wall of said catalytic reactor, and wherein said at least one tangential inlet orifice is located adjacent to said outer wall of said catalytic reactor so as to increase the number of fluid rotations in said swirl box;
passing said vapor and liquid from a space above said swirl box through said at least one tangential inlet orifice and into said swirl box at a location near said side wall and in a direction close to a flow direction of the swirling vapor and liquid inside the swirl box adjacent the at least one tangential inlet orifice;
rotating said vapor and liquid around said outlet opening during a residence time inside said swirl box to provide mixing of said vapor and liquid; and
passing said vapor and liquid from said swirl box through said outlet opening to a space below said swirl box.

25. A mixing device for use in a catalytic reactor and arranged between an upper catalyst bed and a lower catalyst bed thereof for admixing vapor and liquid flowing concurrently inside said reactor through said upper and lower catalyst beds, said mixing device comprising:
- a swirl box comprising a top wall, a side wall and a bottom wall, wherein said side wall is a section of an outer wall of said reactor;
- at least one passageway configured for conducting a concurrent flow of said vapor and liquid in said reactor from a space above said swirl box into said swirl box;
- at least one tangential inlet orifice located in said at least one passageway and configured for high velocity injection of said vapor and liquid into said swirl box, said at least one tangential inlet orifice having a flow-through area relative to the flow rate of said vapor such that a superficial vapor flow velocity in said at least one tangential inlet orifice exceeds $V_v^{Disperse}$ as defined in equation (a)

$$V_v^{Dispersed} = 1.08 \frac{m}{s} \times \sqrt{\frac{\rho_L}{\rho_v}} \qquad (a)$$

during at least one operational phase of said reactor, for dispersion of the liquid into the vapor and/or the vapor into the liquid, and for introducing a swirling flow inside said swirl box, said at least one tangential inlet orifice having an orientation resulting in a flow velocity vector of said injected vapor and liquid that is substantially parallel to a flow direction of the vapor and liquid inside the swirl box at the point of injection of said vapor and liquid; and an outlet opening in said bottom wall configured for conducting a concurrent flow of said vapor and liquid from said swirl box to a space below said swirl box.

\* \* \* \* \*